US012605781B2

(12) United States Patent　　　(10) Patent No.:　US 12,605,781 B2
Hall　　　　　　　　　　　　　　　(45) Date of Patent:　　Apr. 21, 2026

(54) CIRCULAR SAW BLADES

(71) Applicant: BLACK & DECKER INC., New Britain, CT (US)

(72) Inventor: Kenneth Hall, East Longmeadow, MA (US)

(73) Assignee: BLACK & DECKER INC., New Britain, CT (US)

( * ) Notice: Subject to any disclaimer, the term of this patent is extended or adjusted under 35 U.S.C. 154(b) by 569 days.

(21) Appl. No.: 16/733,948

(22) Filed: Jan. 3, 2020

(65) Prior Publication Data

US 2020/0222998 A1　　Jul. 16, 2020

Related U.S. Application Data

(60) Provisional application No. 62/792,096, filed on Jan. 14, 2019.

(51) Int. Cl.
B23D 61/02　　　(2006.01)

(52) U.S. Cl.
CPC ......... B23D 61/021 (2013.01); B23D 61/025 (2013.01)

(58) Field of Classification Search
CPC ... B23D 61/021; B23D 61/025; B23D 61/121
USPC ........................... 83/846, 847, 851, 697, 676
See application file for complete search history.

(56) References Cited

U.S. PATENT DOCUMENTS 191,918 A　6/1877　Tilton
336,380 A　2/1886　Bertram 1,083,645 A　1/1914　Wettstein
1,494,576 A　5/1924　Biedermann et al.
1,771,722 A　*　7/1930　Prentice ............... B23D 61/021
　　　　　　　　　　　　　　　　　　　　　　83/850
2,600,272 A　6/1952　Segal
3,309,756 A　3/1967　Segal (Continued)

FOREIGN PATENT DOCUMENTS

DE　　102007022001 B4　　6/2011
DE　　102012004212 A1　　9/2013

(Continued)

OTHER PUBLICATIONS

Communication Pursuant to Article 94(3) EPC, dated Oct. 20, 2021, Application No. 20151380.1.

(Continued)

*Primary Examiner* — Liang Dong
(74) *Attorney, Agent, or Firm* — Scott B. Markow

(57)　　　　　　　　ABSTRACT

A circular saw blade includes a circular plate-like body having a first side face, an opposite second side face, a periphery, and a central opening defining a center point, and rotatable in a cutting direction. A plurality of circumferentially-spaced teeth are separated by a plurality of gullets. The teeth include a plurality of first beveled teeth with a top face beveled radially inward in a first direction, a plurality of second beveled teeth with a top face beveled radially inward in an opposite second direction, and a plurality of unbeveled teeth. The first beveled teeth, second beveled teeth, and unbeveled teeth are arranged in an alternating top bevel+ raker pattern. Each second beveled tooth is disposed radially inward toward the central opening from each first beveled tooth by a first drop distance.

19 Claims, 11 Drawing Sheets

(56) References Cited

U.S. PATENT DOCUMENTS

| | | | |
|---|---|---|---|
| 4,311,075 A * | 1/1982 | Sundstrom | B23D 61/121 |
| | | | 83/848 |
| 4,574,676 A | 3/1986 | Jansen-Herfeld | |
| 4,727,788 A * | 3/1988 | Yoshida | B23D 61/121 |
| | | | 83/849 |
| 4,776,251 A | 10/1988 | Carter, Jr. | |
| 4,794,835 A | 1/1989 | Fujiyoshi | |
| 4,802,396 A | 2/1989 | Kuklinski | |
| 4,913,022 A | 4/1990 | Kuklinski | |
| 5,012,792 A | 5/1991 | Katwata et al. | |
| 5,038,653 A | 8/1991 | Slocum et al. | |
| 5,182,976 A | 2/1993 | Wittkopp | |
| 5,379,672 A | 1/1995 | Thomas | |
| D382,186 S | 8/1997 | Gakhar et al. | |
| D382,786 S | 8/1997 | Achterberg et al. | |
| D382,787 S | 8/1997 | Gakhar et al. | |
| D383,368 S | 9/1997 | Achterberg et al. | |
| D388,318 S | 12/1997 | Achterberg et al. | |
| 5,855,157 A | 1/1999 | Okamura et al. | |
| 5,868,058 A | 2/1999 | Senegas | |
| 5,896,800 A | 4/1999 | Curtsinger et al. | |
| 6,003,422 A | 12/1999 | Holston | |
| D421,566 S | 3/2000 | Achterberg | |
| 6,119,571 A | 9/2000 | Hayden, Sr. | |
| 6,520,722 B2 | 2/2003 | Hopper et al. | |
| 7,013,784 B2 | 3/2006 | Lowder et al. | |
| 7,036,415 B2 | 5/2006 | Tsujimoto | |
| 7,140,287 B2 | 11/2006 | Lowder et al. | |
| 7,174,823 B2 | 2/2007 | Cranna | |
| 7,225,715 B2 | 6/2007 | Lowder et al. | |
| 7,913,601 B2 | 3/2011 | Petts et al. | |
| 8,826,790 B2 | 9/2014 | Mabon et al. | |
| 9,162,299 B2 | 10/2015 | Kullmann et al. | |
| 2002/0170410 A1 | 11/2002 | Gittel et al. | |
| 2003/0056633 A1 | 3/2003 | Baron et al. | |
| 2004/0016125 A1 * | 1/2004 | Asada | B23D 61/021 |
| | | | 30/1 |
| 2005/0028664 A1 | 2/2005 | Terada et al. | |
| 2007/0227331 A1 * | 10/2007 | Nishio | B23D 61/04 |
| | | | 83/846 |
| 2009/0199693 A1 | 8/2009 | Heyen | |
| 2012/0192694 A1 * | 8/2012 | Brutscher | B23D 61/025 |
| | | | 83/835 |
| 2015/0266118 A1 | 9/2015 | Barbiero et al. | |
| 2016/0008899 A1 | 1/2016 | Hunter et al. | |
| 2017/0120355 A1 * | 5/2017 | Brutscher | B23D 61/021 |
| 2018/0071846 A1 | 3/2018 | Nishio et al. | |
| 2018/0361489 A1 * | 12/2018 | Bird | B23D 61/021 |

FOREIGN PATENT DOCUMENTS

| | | |
|---|---|---|
| EP | 0819491 A1 | 1/1998 |
| EP | 2450141 A1 | 5/2012 |
| EP | 2481509 A1 | 8/2012 |
| EP | 3075480 A1 | 10/2016 |
| JP | S51141881 U | 11/1976 |
| JP | S531186 U | 1/1978 |
| JP | 2003340637 A1 | 12/2003 |
| WO | 198705556 A1 | 9/1987 |
| WO | 2013029857 A1 | 3/2013 |

OTHER PUBLICATIONS

Extended European Search Report, EP Application No. 20151380.1, Jun. 15, 2020, 9 pages, EPO.

* cited by examiner

CIRCULAR SAW BLADES

RELATED APPLICATIONS

This application claims priority under 35 U.S.C. § 119(e) to U.S. Provisional Application No. 62/792,096, filed Jan. 14, 2019, titled "Circular Saw Blades," which is incorporated by reference.

TECHNICAL FIELD

This application relates to circular saw blades.

BACKGROUND

Circular saw blades are commonly used to make long, straight rip cuts using hand-held powered circular saws. The tendency of the saw blade cut on a straight line is referred to as tracking. Existing circular saw blades tend to have poor tracking, resulting in cuts that tend to curve away from a straight line. If a user attempts to compensate for this poor tracking by applying a lateral force to the saw, this can result in reduced blade life or premature failure.

SUMMARY

In an aspect, a circular saw blade includes a circular plate-like body having a first side face, an opposite second side face, a periphery, and a central opening defining a center point, and rotatable in a cutting direction. A plurality of circumferentially-spaced teeth are separated by a plurality of gullets. Each tooth has a rake face facing toward an adjacent gullet in a rotational cutting direction generally transverse to the first and second side faces, a top face generally along the periphery of the body generally transverse to the first and second side faces, a cutting edge at a junction between the rake face and the relief face, a first lateral face joined to the top face at a first top edge, and a second lateral face opposite the first lateral face and joined to the top face at a second top edge. The teeth include a plurality of first beveled teeth, each with its top face beveled radially inward from its first top edge to its second top edge, a plurality of second beveled teeth, each with its top face beveled radially inward from its second top edge to its first top edge, and a plurality of unbeveled teeth. The first beveled teeth, the second beveled teeth, and the unbeveled teeth are arranged in an alternating top bevel+raker (ATB+R) pattern. The first top edge of the second beveled tooth is disposed radially inward toward the central opening from the first top edge of the first beveled tooth by a first drop distance.

Implementations of this aspect may include one or more of the following features. Each rake face may be disposed at a rake angle relative to a line extending radially from the center point to the periphery of the plate-like body. Each rake angle may be from approximately 15° to approximately 22°. Each top face may be disposed at a relief angle relative to a line tangent to the periphery that intersects the cutting edge. Each relief angle may be from approximately 8° to approximately 14°. Each first lateral face may be disposed at a first lateral angle relative to the first side face of the body, and each second lateral face may be disposed at a second lateral angle relative to the second side face of the body. The first lateral angle may be from approximately 0.5° to approximately 3° and the second lateral angle may be from approximately 0.5° to approximately 3°.

The top face of each first beveled tooth is disposed at a first bevel angle relative to a line perpendicular to the plate-like body, and the top face of each second beveled tooth is disposed at a second bevel angle relative to the line perpendicular to the plate-like body. The first and second bevel angles may be the same. The first bevel angle may be from approximately 12° to approximately 18° and the second bevel angle may be from approximately 12° to approximately 18°. The first drop distance may be from approximately 0.025 mm to 0.075 mm. The first drop distance may be calculated according to the equation $d=f/(w \times t)$, where d is the first drop distance, f is the expected linear feed rate when using the saw blade (e.g., in inches per minute), w is the expected rotational speed of the saw blade when using the saw blade (e.g., in revolutions per minute), and t is the number of teeth on the saw blade.

The first and second top edges of each unbeveled tooth may be disposed radially inward toward the central opening from the first top edge of each first beveled tooth by a second drop distance. The second drop distance may be greater than the first drop distance. The second drop distance may be more than twice the first drop distance. The first drop distance may be from approximately 0.025 mm to 0.075 mm and the second drop distance may be from approximately 0.10 mm to 0.30 mm.

The circular saw blade may further include a first set of fully enclosed, arcuate inner body slots, each having a first midpoint and defined in the body between the central opening and the periphery, and a plurality of fully enclosed, arcuate outer body slots, each having a second midpoint and defined in the body between the inner body slots and the periphery. The inner body slots may be equally angularly spaced about the center point and the outer body slots may be equally angularly spaced about the center point. Each first midpoint may be spaced a first radial distance from the center point and each second midpoint may be spaced a second radial distance from the center point that is greater than the first radial distance. The first midpoint of each of the inner body slots may be generally radially aligned with the second midpoint of one of the outer body slots to form a pair of aligned body slots. The inner body slot and the outer body slot in each pair of aligned body slots may be concentric with the center point. The inner body slot and the outer body slot in each pair of aligned body slots may be concentric with a point that is spaced radially outward from the center point. The pairs of aligned body slots may include three pairs of aligned body slots equally angularly spaced by 120°. The pairs of aligned body slots may include four pairs of aligned body slots equally angularly spaced by 90°. Each of the outer body slots may have a pair of arcuate end sections and an undulating section between the arcuate end sections. The first and second body slots may be configured to provide one or zero modal frequencies in an operating frequency range of the saw blade.

A tension region may be defined in the body disposed between the first set of body slots and the second set of body slots. The teeth may be spaced at a constant tooth pitch or at a variable tooth pitch. The variable tooth pitch may include three different tooth pitches. The plurality of teeth further may include a plurality of unbeveled teeth, each with an unbeveled top face, with the first beveled teeth, the second beveled teeth, and the unbeveled teeth arranged in an alternating top bevel+raker (ATB+R) pattern. Each first beveled tooth may be spaced from an adjacent second beveled tooth in the cutting direction by a first angular distance, each second beveled tooth may be spaced from an adjacent unbeveled tooth in the cutting direction by a second angular distance that is greater than the first angular distance, and each unbeveled tooth may be spaced from an adjacent first beveled tooth in the cutting direction by a third angular distance that is greater than the second angular distance. The first angular distance may be from approximately 5° to approximately 15°, the second angular distance may be from approximately 10° to approximately 20°, and the third angular distance may be from approximately 15° to approximately 25°.

In another aspect, a circular saw includes a circular body including a periphery and a central opening defining a center point. A plurality of teeth is spaced around the periphery of the body. A first set of three fully enclosed, arcuate, inner body slots is defined in the body. Each inner body slot extends generally in a circumferential direction from a first distal end to a second distal end, where a first midpoint of each inner body slot is disposed a first radial distance from the center point. The inner body slots are equally angularly spaced about the center point. A second set of three fully enclosed, arcuate, outer body slots is defined in the body. Each outer body slot extends generally in a circumferential direction from a third distal end to a fourth distal end, where a second midpoint of each outer body slot is disposed a second radial distance from the center point that is greater than the first radial distance. The outer body slots are spaced equally angularly spaced about center point. Each outer body slot is aligned radially with a corresponding one of the inner body slots such that for each radially aligned outer body slot and inner body slot, a radius of the body extends from the center point through the first and second midpoints. Each radially aligned outer body slot and inner body slot are concentric with a point that is disposed radially outward from the center point along the radius.

Implementations of this aspect may include one or more of the following features. Each first midpoint may be spaced from each adjacent first midpoint by 120° and each second midpoint may be spaced from each adjacent second midpoint by 120°. Each of the outer body slots may have a pair of arcuate end sections and an undulating section between the arcuate end sections. The inner and outer body slots may be configured to provide one or zero modal frequencies in an operating frequency range of the saw blade. A tension ring may be defined in the body disposed between the first set of body slots and the second set of body slots.

The plurality of teeth may be separated by a plurality of gullets. Each tooth may have a rake face facing toward an adjacent gullet in a rotational cutting direction generally transverse to the first and second side faces, a top face generally along the periphery of the body generally transverse to the first and second side faces, a cutting edge at a junction between the rake face and the relief face, a first lateral face joined to the top face at a first top edge, and a second lateral face opposite the first lateral face and joined to the top face at a second top edge. The plurality of teeth may include a plurality of first beveled teeth, each with its top face beveled radially inward from its first top edge to its second top edge, and a plurality of second beveled teeth, each with its top face beveled radially inward from its second top edge to its first top edge. The first and second beveled teeth may be arranged in an alternating top bevel (ATB) pattern. Alternatively, the plurality of teeth may further include a plurality of unbeveled teeth, each with an unbeveled top face, and the first beveled teeth, the second beveled teeth, and the unbeveled teeth are arranged in an alternating top bevel+raker (ATB+R) pattern.

The teeth may be spaced at a constant tooth pitch or at a variable tooth pitch. The variable tooth pitch may include three different tooth pitches. Each first beveled tooth may be spaced from an adjacent second beveled tooth in the cutting direction by a first angular distance, each second beveled tooth is spaced from an adjacent unbeveled tooth in the cutting direction by a second angular distance that is greater than the first angular distance, and each unbeveled tooth is spaced from an adjacent first beveled tooth in the cutting direction by a third angular distance that is greater than the second angular distance.

In another aspect, a circular saw blade includes a circular plate-like body having a first side face, an opposite second side face, a periphery, and a central defining a center point. A plurality of circumferentially-spaced teeth are separated by a plurality of gullets. Each tooth has a rake face facing toward an adjacent gullet in a rotational cutting direction generally transverse to the first and second side faces, a top face generally along the periphery of the body generally transverse to the first and second side faces, a cutting edge at a junction between the rake face and the relief face, a first lateral face joined to the top face at a first top edge, and a second lateral face opposite the first lateral face and joined to the top face at a second top edge. The teeth include a plurality of first beveled teeth, each with its top face beveled radially inward from its first top edge to its second top edge, a plurality of second beveled teeth, each with its top face beveled radially inward from its second top edge to its first top edge, and a plurality of unbeveled teeth. The first beveled teeth, the second beveled teeth, and the unbeveled teeth are arranged in an alternating top bevel+raker (ATB+ R) pattern. The first top edge of each second beveled tooth is disposed radially inward toward the central opening from the second top edge of the first beveled tooth by a first drop distance. A first set of three fully enclosed, arcuate, inner body slots is defined in the body. Each inner body slot extends generally in a circumferential direction from a first distal end to a second distal end. A first midpoint of each inner body slot is disposed a first radial distance from the center point. The inner body slots are equally angularly spaced about the center point. A second set of three fully enclosed, arcuate, outer body slots is defined in the body. Each outer body slot extends generally in a circumferential direction from a third distal end to a fourth distal end. A second midpoint of each outer body slot is disposed a second radial distance from the center point that is greater than the first radial distance. The outer body slots are spaced equally angularly spaced about center point. Each outer body slot is aligned radially with a corresponding one of the inner body slots such that for each radially aligned outer body slot and inner body slot, a radius of the body extends from the center point through the first and second midpoints. Each radially aligned outer body slot and inner body slot are concentric with a point that is disposed radially outward from the center point along the radius.

Implementations of this aspect may include one or more of the following features. The first and second top edges of each unbeveled tooth may be disposed radially inward toward the central opening from the first top edge of each first beveled tooth by a second drop distance. The second drop distance may be greater than the first drop distance. The teeth may be spaced at a constant tooth pitch or at a variable tooth pitch. The variable tooth pitch may include three different tooth pitches. Each first beveled tooth may be spaced from an adjacent second beveled tooth in the cutting direction by a first angular distance. Each second beveled tooth may be spaced from an adjacent unbeveled tooth in the cutting direction by a second angular distance that is greater than the first angular distance. Each unbeveled tooth may be spaced from an adjacent first beveled tooth in the cutting direction by a third angular distance that is greater than the second angular distance.

Advantages may include one or more of the following. The saw blades disclosed in this patent application have improved tracking along a straight line. This reduces the need for the user to apply lateral forces to maintain a straight cut, and thus improves blade life and reduces instances of premature failure. These and other advantages and features will be apparent from the description and the drawings.

DETAILED DESCRIPTION

Figure 1:
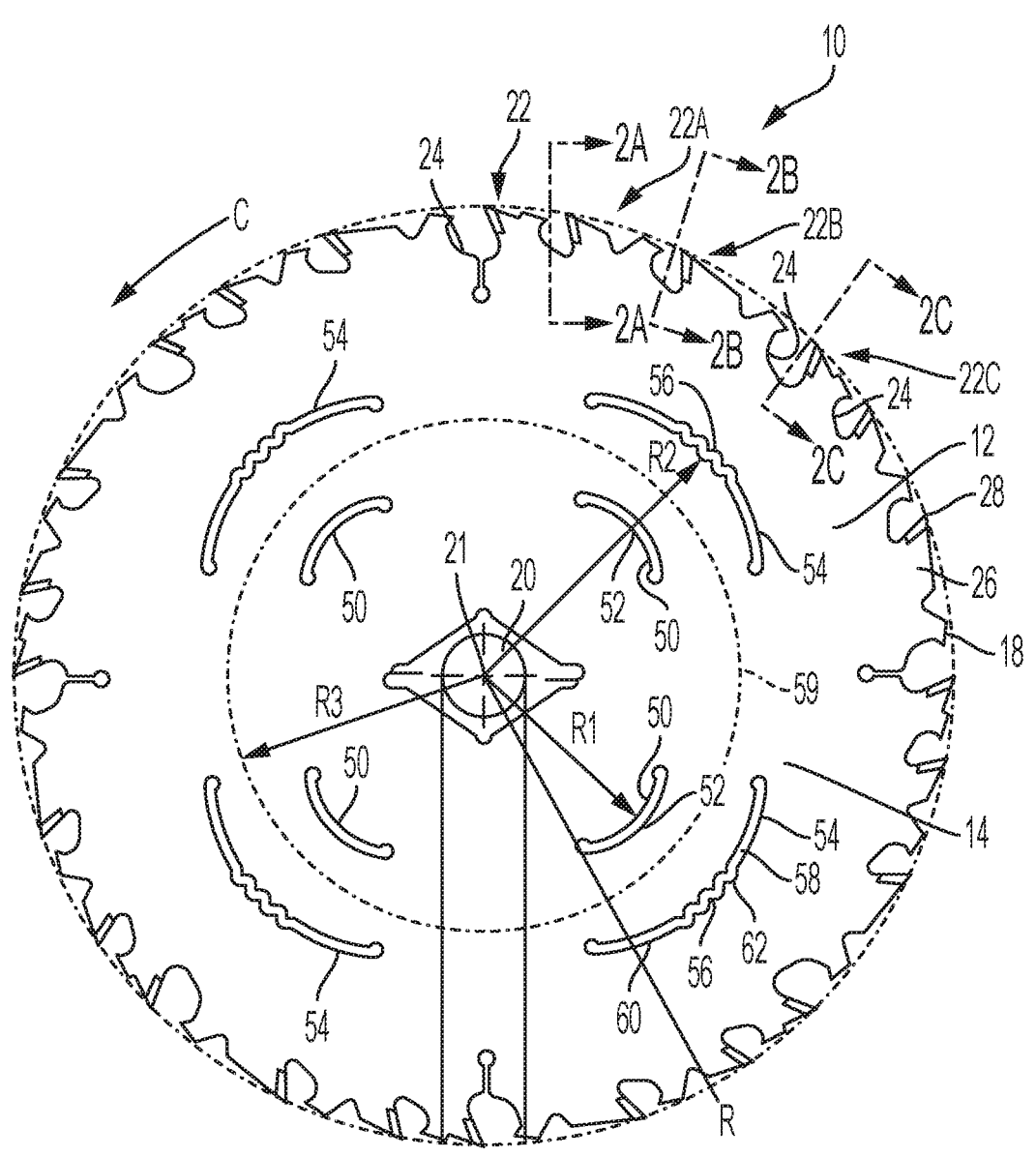
FIG. 1 is a side view of an embodiment of a circular saw blade in accordance with this disclosure.
Figures 2A, 2B, 2C:
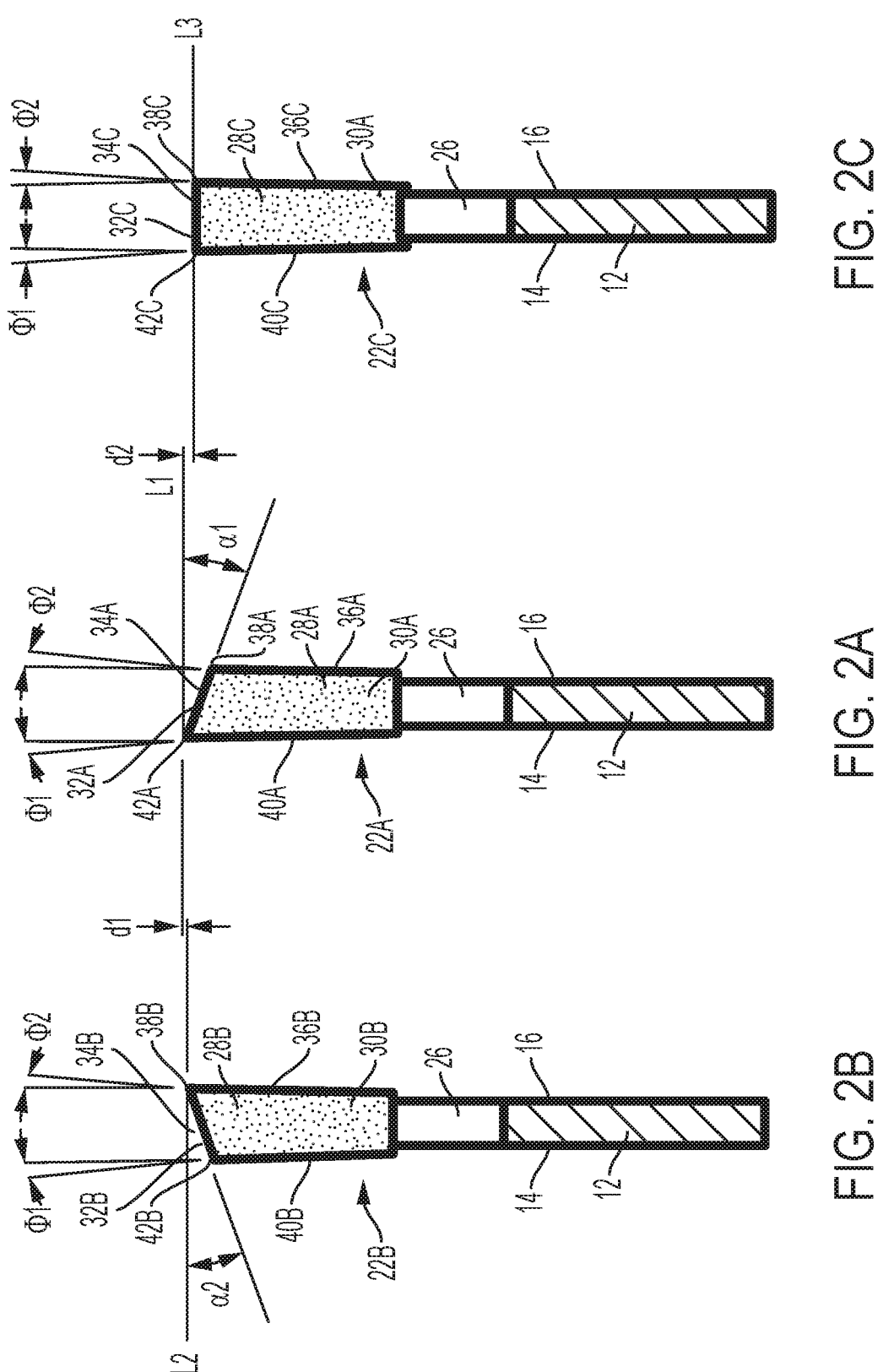
FIGS. 2A-2C are front partially cross-sectional views of a first beveled tooth, a second beveled tooth, and an unbeveled tooth of the saw blade of FIG. 1, taken along lines 2A-2A, 2B-2B, and 2C-2C, respectively.

Referring to FIGS. 1-2C and 4, in an embodiment, a circular saw blade 10 rotatable in a cutting direction C. The circular saw blade 10 includes a circular plate-like body 12 having a first side face 14, an opposite second side face 16, a periphery 18, and a central opening 20 defining a center point 21. Couple to the periphery 18 are a plurality of circumferentially-spaced teeth 22 separated by a plurality of gullets 24. Each tooth 22 has a holding portion 26 and a hard-metal (e.g., carbide or cermet) cutting insert 28. The cutting insert 28 of each tooth 22 has a rake face 30 facing toward an adjacent gullet 24 in the rotational cutting direction C generally transverse to the first and second side faces 14, 16 of the body 12. Each cutting insert 28 also has a top face 32 generally along the periphery 18 of the body 12 generally transverse to the first and second side faces 14, 16 of the body 12. A cutting edge 34 is disposed at a junction between each rake face 30 and each top face 32. A first lateral face 36 is joined to each top face 32 at a first top edge 38, and a second lateral face 40 opposite the first lateral face 36 is joined to each top face 32 at a second top edge 42.

Each rake face 30 may be disposed at a rake angle Θ relative to a line R that extends radially outward from the center point 21 and intersects the cutting edge 34. For example, each rake angle Θ may be from approximately 15° to approximately 22° (e.g., approximately 18°. Each top face 32 may be disposed at a relief angle γ relative to a tangent line T to the periphery that intersects the cutting edge 34. Each relief angle γ may be from approximately 8° to approximately 14° (e.g., approximately 12°). Each first lateral face 36 may be disposed at a first lateral angle φ1 relative to the first side face 14 of the body 12, and each second lateral face 40 is disposed at a second lateral angle φ2 relative to the second side face 16 of the body 12. For example, the first lateral angle φ1 may be from approximately 0.5° to approximately 3° (e.g., approximately 1.7°) and the second lateral angle φ2 may be from approximately 0.5° to approximately 3° (e.g., approximately 1.7°). In the illustrated embodiment, the first lateral angle φ1 and the second lateral angle φ2 are the same so that the cutting teeth 22 are balanced. However, in other embodiments, the first lateral angle φ1 and the second lateral angle φ2 may be different.

The teeth 22 include a plurality of first beveled teeth 22A, a plurality of second beveled teeth 22B, and a plurality of unbeveled or raker teeth 22C. Each of the first beveled teeth 22A has a top face 32A beveled radially inward from its first top edge 42A to its second top edge 28A. Each of the second beveled teeth 22B has a top face 32B beveled radially inward from its second top edge 38B to its first top edge 42B. The first beveled teeth 22A, the second beveled teeth 22B, and the unbeveled teeth 22C may be arranged in an alternating top bevel+raker (ATB+R) pattern where the teeth 22 have a repeating sequence of one first beveled tooth 22A, followed by one second beveled tooth 22B, followed by one unbeveled tooth 22C.

The top face 32A of each first beveled tooth 22A is disposed at a first bevel angle α1 relative to a first line L1 perpendicular to the body 12, and the top face 32B of each second beveled tooth 22B is disposed at a second bevel angle α2 relative to a second line L2 perpendicular to the body 12. For example, the first bevel angle α1 may be from approximately 12° to approximately 18° (e.g., approximately 16°) and the second bevel angle may be from approximately 12° to approximately 18° (e.g., approximately 16°). In the illustrated embodiment, the first and second bevel angles α1 and α2 are the same so that the teeth 22A and 22B are balanced. However, in other embodiments, the first and second bevel angles α1 and α2 may be different.

In order to improve tracking and saw blade life, the second top edge 38B of the second beveled tooth 22B is disposed radially inward toward the central opening from the first top edge 42A of the first beveled tooth 22A by a first drop distance d1 (i.e., the distance between lines L1 and L2). The first drop distance is calculated according to the equation:

$$d1 = f/(\omega \times t)$$

where d1 is the first drop distance, f is the expected linear feed rate of the saw blade when using the saw blade (e.g., in inches or feet per minute), ω is the expected rotational speed of the saw blade when using the saw blade (e.g., in revolutions per minute), and t is the number of teeth on the saw blade. For example, for a 24 tooth saw blade, rotating at 5000 rpm, with a feed rate of 25 feet/minute, the first drop distance d1=(25 ft./min.)/(5000 rpm×24 teeth)=0.000208 feet=0.0025 inches=0.06 mm. In other examples, the first drop distance d1 may be from approximately 0.025 mm to approximately 0.075 mm.

In addition, the first and second top edges 38C, 42C of each unbeveled tooth 22C are disposed radially inward toward the central opening from the first top edge 38A of the first beveled tooth 22A by a second drop distance d2. In an embodiment, the second drop distance d2 is greater than the first drop distance d1, and may be more than double the first drop distance d1. For example, the first drop distance d1 may be from approximately 0.025 mm to 0.075 mm (e.g., approximately 0.06 mm) and the second drop distance may be from approximately 0.10 mm to 0.30 mm (e.g., approximately 0.20 mm).

Figure 3B:
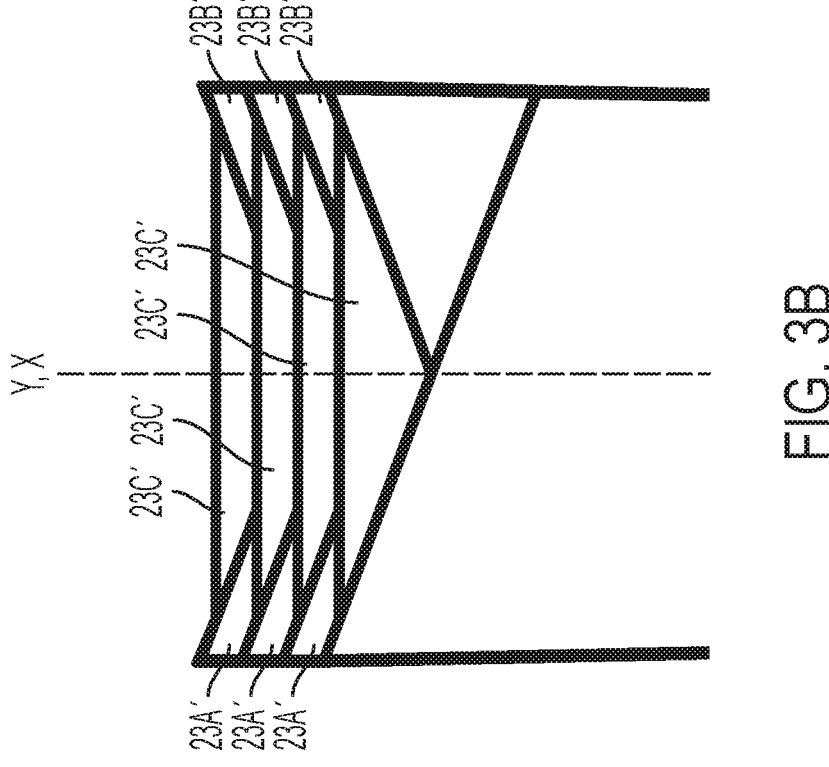
FIGS. 3A and 3B are schematic chip models of workpiece material removed by an existing circular saw blade and by the circular saw blade of FIG. 1, respectively.
Figure 3A:
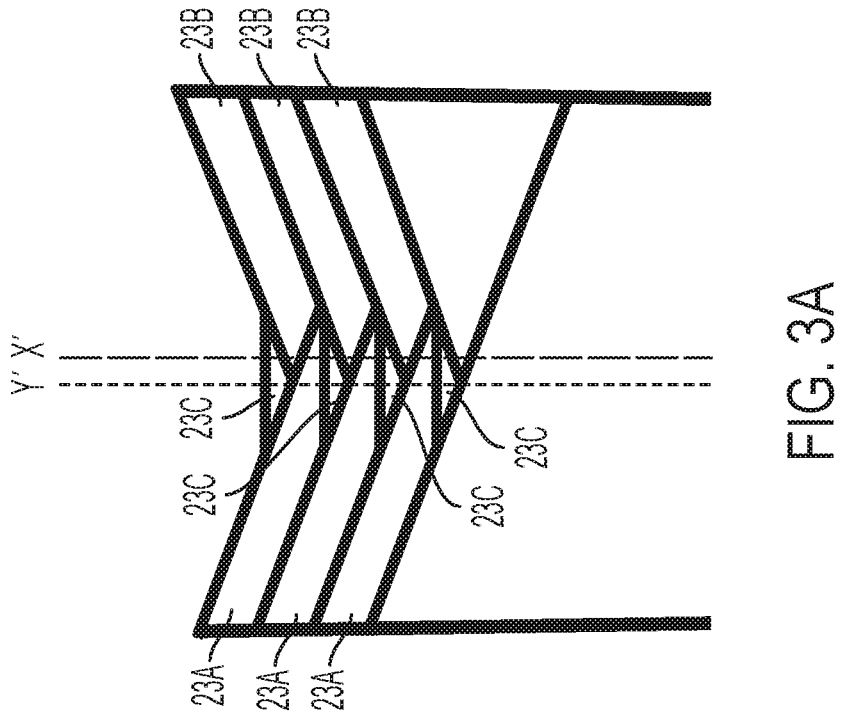

FIG. 3A is a schematic chip model showing portions of workpiece material removed by an existing ATB+R saw blade having first beveled teeth, second beveled teeth, and unbeveled teeth with their top faces arranged in an ATB+R pattern. In this saw blade there is no drop distance between the first and second beveled teeth and there is a large drop distance d3 between the tops of the first and second beveled teeth and the unbeveled teeth. As the saw blade cuts through material, a first beveled tooth removes a first trapezoidal chip portion 23A, followed by a second bevel tooth removing a second trapezoidal chip portion 23B, followed by the unbeveled tooth removing a third triangular chip portion 23C. This process repeats as the saw blade cuts through the material. When using this existing saw blade, there tends to be an inherent imbalance of the actual center line Y' of the cut away from the intended center line X' of the cut. It is believed that the ATB+R pattern causes the saw blade 10' to pull toward the side of the blade body with the second beveled cutting tooth that enters the workpiece second. The user may attempt to compensate for this imbalance by applying a lateral force F in the opposite direction, resulting in poor tracking, unstraight cuts, and reduced saw blade life.

FIG. 3B is a schematic chip model showing portions of workpiece material removed by the saw blade 10 shown in FIGS. 1-2C and 4. As the saw blade 10 cuts through material, the first beveled tooth 22A removes a first trapezoidal chip portion 23A', followed by the second beveled tooth 22B removing a second trapezoidal chip portion 23B', followed by the unbeveled tooth removing a third triangular chip portion 23C'. This process repeats as the saw blade 10 cuts through the material. The first drop distance d1 of the second beveled teeth 22B relative to the first beveled teeth 22A helps balance the amount of material removed by the first and second beveled teeth 22A, 22B, reducing the tendency of center line X of the cut by the saw blade 10 to pull laterally away from the intended center line Y of the cut. This in turn, reduces the need for the user to apply lateral forces to the saw blade 10 to bring it back toward the intended cut line Y. Thus, the actual cut line X tends to be coincident with the intended cut line Y, and the saw blade 10 improves tracking, results in straighter cuts, and increases saw blade life.

In addition, the second drop distance d2 of the unbeveled teeth 22C optionally may be less than the drop distance d3 of the unbeveled teeth in existing saw blades, causing more material to be removed by the unbeveled teeth 22C (i.e., chip 23C' is larger than chip 23C), which increases the life and durability of the saw blade 10. However, the second drop distance d2 of the unbeveled teeth 22C will still be greater than the first drop distance d1 of the second beveled teeth 22B.

Figure 4:
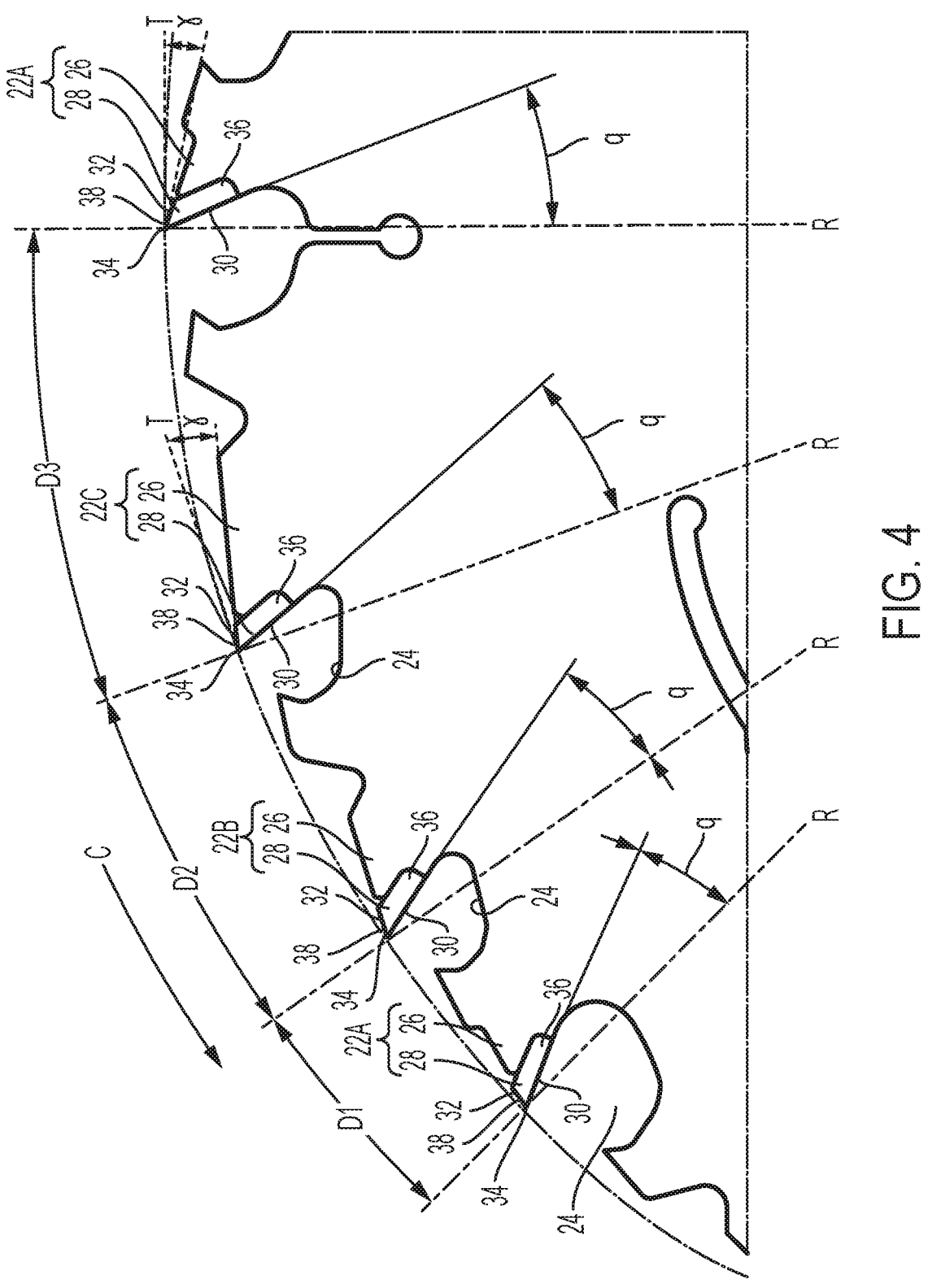
FIG. 4 is a close-up view of the cutting teeth of the saw blade of FIG. 1.
Figure 5:
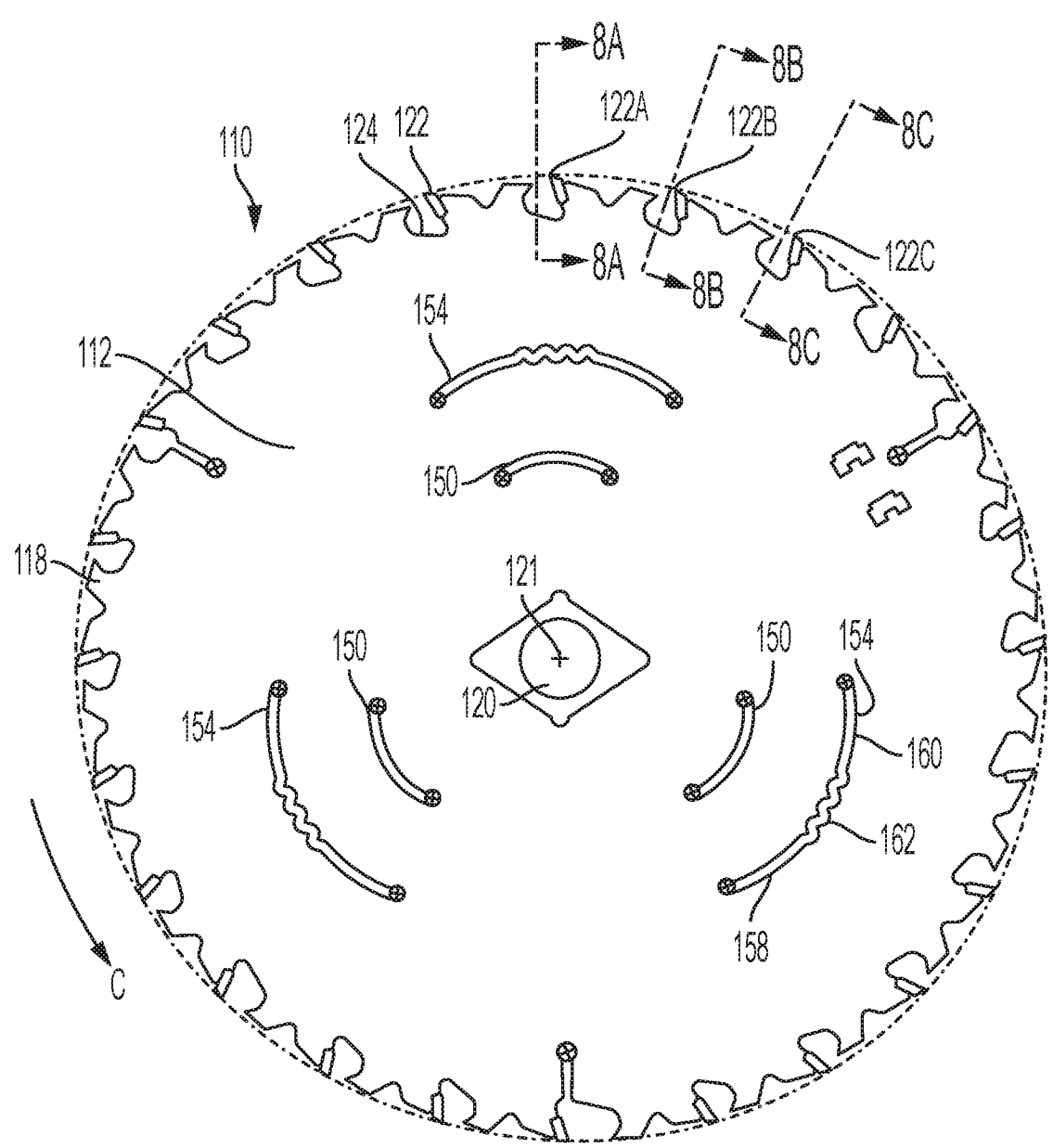
FIG. 5 is a side view of another embodiment of a circular saw blade in accordance with this disclosure.

In some embodiments, the teeth 22 may be spaced at a variable tooth pitch so that the spacing between adjacent teeth 22 is not constant. For example, as shown in FIG. 4, the repeating sequence of teeth 22 comprising the first beveled tooth 22A, the second beveled tooth 22B, and the unbeveled tooth 22C in an ATB+R pattern may be spaced by three different tooth pitches. Each first beveled tooth 22A may be spaced from an adjacent second beveled tooth 22B in the cutting direction C by a first angular distance $\Delta 1$. Each second beveled tooth 22B may be spaced from the adjacent unbeveled tooth 22C in the cutting direction C by a second angular distance $\Delta 2$ that is greater than the first angular distance $\Delta 1$. Each unbeveled tooth 22C may be spaced from the adjacent first beveled tooth 22A in the cutting direction C by a third angular distance $\Delta 3$ that is greater than the second angular distance 2. In an embodiment, the first angular distance $\Delta 1$ may be from approximately 5° to approximately 15° (e.g., approximately 10°), the second angular distance $\Delta 2$ may be from approximately 10° to approximately 20° (e.g., approximately 15°), and the third angular distance 3 may be from approximately 15° to approximately 25° (e.g., approximately 20°).

The circular saw blade 10 may further include a first set of fully enclosed, arcuate inner body slots 50, each defined in the body 12 between the central opening 20 and the periphery 18 and having a first midpoint 52 spaced a first radial distance R1 from the center point 21. The circular saw blade 10 also has and a second set of fully enclosed, arcuate outer body slots 54, each defined in the body 12 between the central opening 20 and the periphery 18 and having a second midpoint 56 spaced a second radial distance R2 from the center point 21 that is greater than the first radial distance R1. For example, the first radial distance R1 may be approximately 30 mm to 50 mm (e.g., approximately 40 mm), the second radial distance R2 may be approximately 50 mm to 70 mm (e.g., approximately 60 mm).

The inner body slots 50 are equally angularly spaced about the center point 21 and the outer body slots 54 are equally angularly spaced about the center point 21 at substantially the same angular distance. For example, in the embodiment of FIG. 1, there are four inner body slots 50 equally angularly spaced at 90° intervals and four outer body slots 54 equally angularly spaced at substantially the same 90° intervals. In alternative embodiments, the saw blade may have a different number of body slots spaced at different equally angularly intervals.

As shown in FIG. 1, the first midpoint 52 of each of the inner body slots 50 is generally radially aligned with the second midpoint 56 of one of the outer body slots 52 to form a plurality of pairs of aligned body slots 50, 54. The inner body slots 50 and the outer body slots 54 are generally concentric with the center point 21 of the body 12. Each of the inner body slots 50 is arcuate in shape and each of the outer body slots 54 has a pair of arcuate end sections 58, 60 and an undulating intermediate section 62 between the arcuate end sections 58, 60. The body slots 50, 54 may have the same configuration or be designed according to the same principles as disclosed in U.S. Pat. No. 9,821,390, which is incorporated by reference. As such, the first and second body slots 50, 54 may be configured to provide one or zero modal frequencies in an operating frequency range of the saw blade.

The saw blade 10 may additionally include a tension ring 59 concentric with the center point 21 and disposed a third radial distance R3 having a radial length between the radial length of the first radial distance R1 and the second radial distance R2 so that the tension ring is between the first body slots 50 and the second body slots 54. For example, the third radial distance R1 may be approximately 40 mm to 60 mm (e.g., approximately 50 mm). The tension ring 59 is configured to add tensile stress to the periphery 18 of the saw blade 10. This will add stability to the blade body 12 by adding stiffness to periphery 18. The tension ring 59 further enhances the ability of the saw blade 10 to handle the cutting forces and to track along a straight line. The tension ring 59 may be formed by using a roller to roll the ring 58 into the blade body 12 in order to create the tensile stress.

Referring to FIGS. 5-8B, in another embodiment, a circular saw blade 110, rotatable in a cutting direction C, includes a circular plate-like body 112 having a first side face 114, an opposite second side face 116, a periphery 118 with a plurality of circumferentially-spaced teeth 122 separated by a plurality of gullets 124, and a central opening 120 defining a center point 121. Each tooth 122 has a holding portion 126 and a hard-metal (e.g., carbide or cermet) cutting insert 128. The cutting insert 128 of each tooth 122 has a rake face 130 facing toward an adjacent gullet 124 in the rotational cutting direction C generally transverse to the first and second side faces 114, 116 of the body 112. Each cutting insert 128 also has a top face 132 generally along the periphery 118 of the body 112 generally transverse to the first and second side faces 114, 116 of the body 12. A cutting edge 134 is disposed at a junction between each rake face 130 and each top face 132. A first lateral face 136 is joined to each top face 132 at a first top edge 138, and a second lateral face 140 opposite the first lateral face 136 is joined to each top face 132 at a second top edge 142.

Each rake face 130 may be disposed at a rake angle Θ' relative to a line R' that extends radially outward from the center point 21 and that intersects the cutting edge 134. For example, each rake angle Θ' may be from approximately 15° to approximately 22° (e.g., approximately 18°. Each top face 132 may be disposed at a relief angle γ' relative to a tangent line T' to the periphery that intersects the cutting edge 134. Each relief angle γ' may be from approximately 8° to approximately 14° (e.g., approximately 12°. Each first lateral face 136 may be disposed at a first lateral angle φ' relative to the first side face 114 of the body 112, and each second lateral face 140 may be disposed at a second lateral angle φ2' relative to the second side face 116 of the body 112. For example, the first lateral angle φ' may be from approximately 0.5° to approximately 3° (e.g., approximately 1.7° and the second lateral angle φ2' may be from approximately 0.5° to approximately 3° (e.g., approximately 1.7°). In the illustrated embodiment, the first lateral angle φ1' and the second lateral angle φ2' are the same so that the cutting teeth 122 are balanced. However, in other embodiments, the first lateral angle φ1' and the second lateral angle φ2' may be different.

The teeth 122 include a plurality of first beveled teeth 122A, a plurality of second beveled teeth 122B, and a plurality of unbeveled or raker teeth 122C. Each of the first beveled teeth 122A has a top face 132A beveled radially inward from its first top edge 142A to its second top edge 128A. Each of the second beveled teeth 122B has a top face 132B beveled radially inward from its second top edge 138B to its first top edge 142B. The first beveled teeth 122A, the second beveled teeth 122B, and the unbeveled teeth 122C may be arranged in an alternating top bevel+raker (ATB+R) pattern where the teeth 122 have a repeating sequence of one first beveled tooth 122A, followed by one second beveled tooth 122B, followed by one unbeveled tooth 122C.

The top face 132A of each first beveled tooth 122A is disposed at a first bevel angle α1' relative to a first line L1' perpendicular to the body 112, and the top face 132B of each second beveled tooth 122B is disposed at a second bevel angle α2' relative to a second line L2' perpendicular to the body 112. For example, the first bevel angle α1' may be from approximately 12° to approximately 18° (e.g., approximately 16°) and the second bevel angle α2' may be from approximately 12° to approximately 18° (e.g., approximately 16°). In the illustrated embodiment, the first and second bevel angles α1' and α2' are the same so that the teeth 122A and 122B are balanced. However, in other embodiments, the first and second bevel angles α1' and α2' may be different In order to improve tracking and saw blade life, the second top edge 142B of the second beveled tooth 122B is disposed radially inward toward the central opening from the first top edge 138A of the first beveled tooth 122A by a first drop distance d1' (i.e., the distance between lines L1 and L2). The drop distance is calculated according to the equation:

$$d1'=f(\omega \times t)$$

where d1' is the drop distance, f is the expected linear feed rate of the saw blade when using the saw blade (e.g., in inches or feet per minute), ω is the expected rotational speed of the saw blade when using the saw blade (e.g., in revolutions per minute), and t is the number of teeth on the saw blade. For example, for a 24 tooth saw blade, rotating at 5000 rpm, with a feed rate of 25 feet/minute, the first drop distance d=(25 ft./min.)/(5000 rpm×24 teeth)=0.000208 feet=0.0025 inches=0.06 mm. In other examples, the first drop distance d may be from approximately 0.025 mm to approximately 0.075 mm. Each unbeveled tooth 122C is disposed radially inward toward the central opening from the first top edge 138A of the first beveled tooth 122A by a second drop distance d2'. In an embodiment, the second drop distance d2' is greater than the first drop distance d1', and may be more than double the first drop distance d1'. For example, the first drop distance d1' may be from approximately 0.025 mm to 0.075 mm (e.g., approximately 0.06 mm) and the second drop distance may be from approximately 0.10 mm to 0.30 mm (e.g., approximately 0.20 mm).

Figure 7:
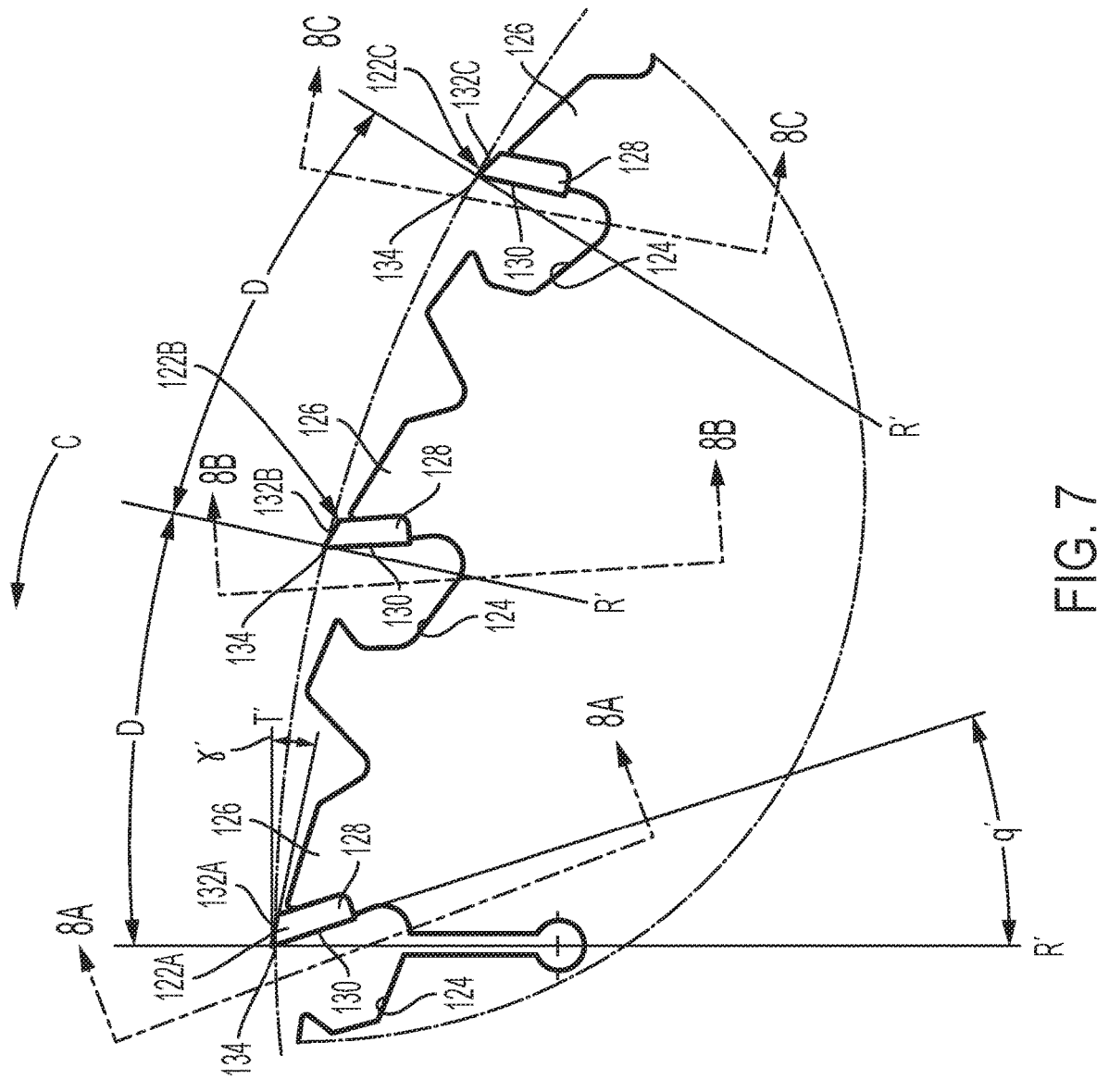
FIG. 7 is a close-up view of the cutting teeth of the saw blade of FIG. 5.
Figures 8A, 8B, 8C:
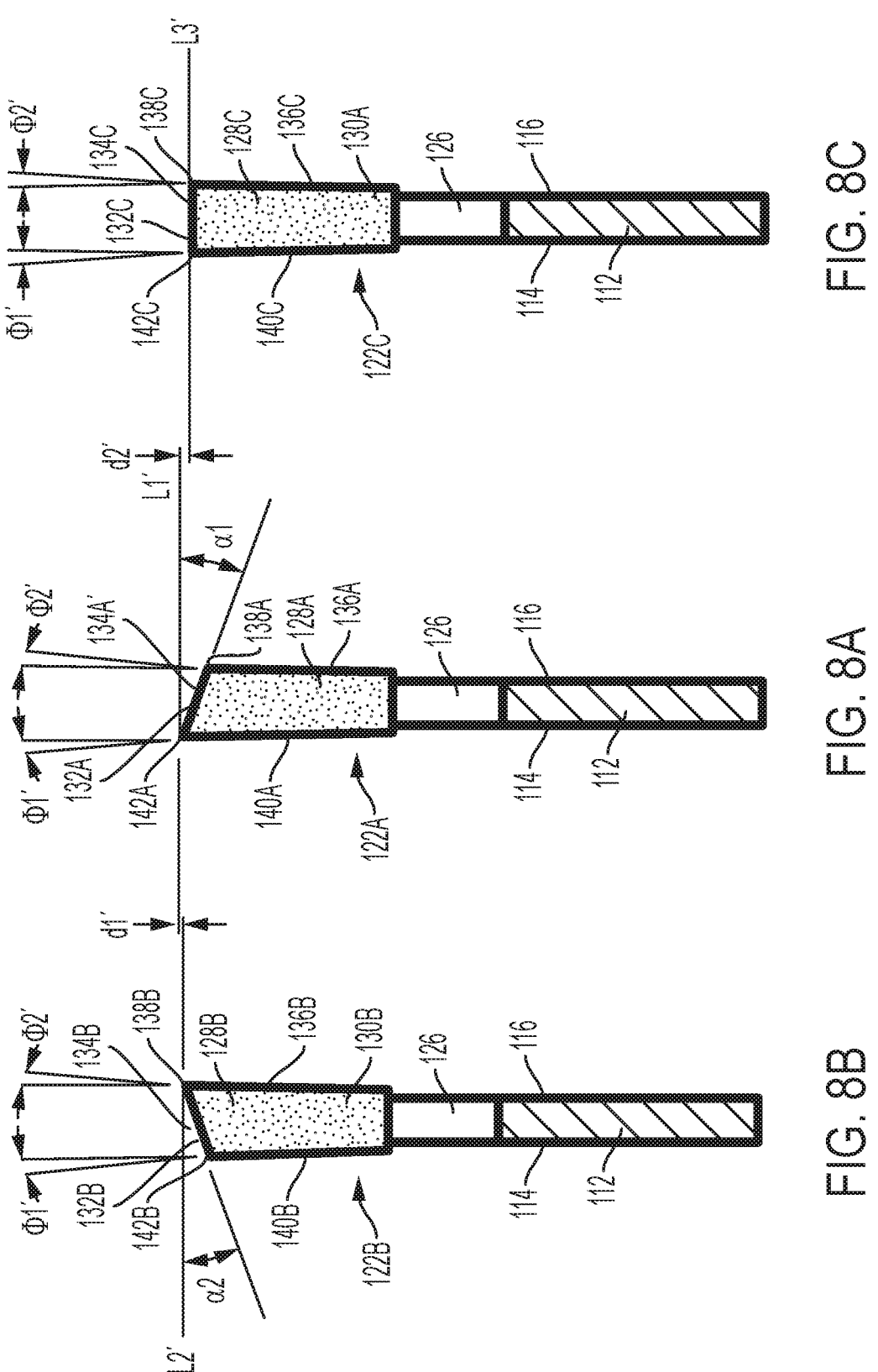
FIGS. 8A, 8B, and 8C are front partially cross-sectional views of a first beveled tooth, a second beveled tooth, and an unbeveled tooth of the saw blade of FIG. 5, taken along lines 8A-8A, 8B-8B, and 8C-8C, respectively.

The saw blade 110 has substantially the same design as the saw blade 10 of FIGS. 1-2C and 4, except for the following differences. First, Second, the teeth 122 are spaced apart by a substantially constant tooth pitch. For example, as shown in FIG. 7, each tooth 122A may be spaced from an adjacent tooth 122B in the cutting direction C by an angular distance Δ. In an embodiment, the angular distance Δ may be from approximately 10° to approximately 20° (e.g., approximately 15°).

Second, the circular saw blade 110 defines a first set of fully enclosed, arcuate inner body slots 150, each defined in the body 112 between the central opening 120 and the periphery 118 and a second set of fully enclosed, arcuate outer body slots 154 between the inner body slots 150 and the periphery 118. The inner body slots 150 each have a first midpoint 152 and the outer body slots 154 each have a second midpoint 156 that is radially aligned with the first midpoint 150 so that the inner body slots 150 and the outer body slots 152 form a plurality of pairs of aligned body slots 150, 154. The inner body slots 150 and outer body slots 154 are similar in shape to the inner body slots 50 and the outer body slots 54 of the saw blade 10 of FIGS. 1-2C and 4. Each inner body slot 150 is arcuate in shape and each of the outer body slots 154 has a pair of arcuate end sections 158, 160 and an undulating intermediate section 162 between the arcuate end sections 158, 160. The saw blade 110 may optionally include a tension ring similar to the tension ring 59 in the saw blade 10 between the inner and outer body slots 150, 154.

Unlike the four pairs of inner body slots 50 and outer body slots 54 equally angularly spaced about the center point 121 at 90° intervals in the saw blade 10 of FIGS. 1-2C and 4, the saw blade 110 has three pairs of inner body slots 150 and outer body slots 154 equally angularly spaced about the center point 121 at 120° intervals. It has been discovered that, in the saw blade 10, the four pairs of body slots 50, 54 angularly spaced at 90° intervals creates two paths through the center point 21 of the saw blade separated by 180°, which become natural paths along which the saw blade tends to deflect. This can reduce blade stiffness, which can cause poorer tracking and blade life. In the saw blade 110, the three pairs of body slots 150, 154 angularly spaced at 120° intervals eliminates the natural paths of deflection through the center point 121 of the body 112. This helps increase blade stiffness, which may improve tracking and blade life.

Figure 6:
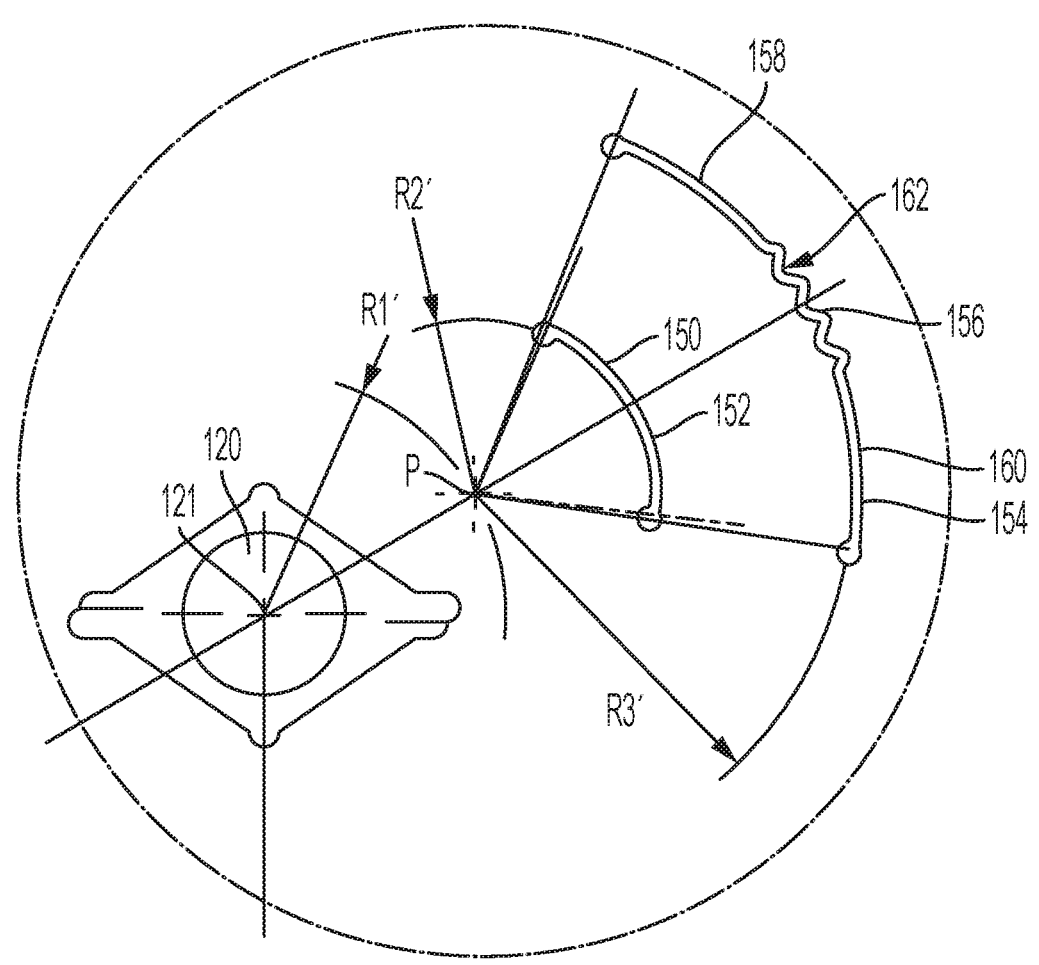
FIG. 6 is a close-up view of one set of the body slots of the saw blade of FIG. 5.

In addition, referring to FIG. 6, unlike the pairs of inner body slots 50 and outer body slots 54 in the saw blade 10 that are generally concentric with the center point 21 of the body 12, each pair of an inner body slot 150 and an outer body slot 154 in the saw blade 110 is concentric with a point P that is spaced radially outward from the center point 121. Each point P may be spaced a first radial distance R1' from the center point 121, while each inner body slot 150 may be spaced a second radial distance R2' from the point P, and each outer body slot 154 may be spaced a third radial distance R3 that is greater than the second radial distance R2' from the point P. For example, for a saw blade having a diameter of ¼" and 24 teeth, the first radial distance R1' may be approximately 15 mm to 25 mm (e.g., approximately 20 mm), the second radial distance R2' may be approximately 15 mm to 25 mm (e.g., approximately 19 mm), and the third radial distance may be approximately 30 mm to 45 mm (e.g., approximately 39 mm). Saw blades having different diameters and numbers of teeth may have different radial distances. Configuring each pair of body slots 150, 154 to be non-concentric about the center point 121, effectively lengthens the cord length about which the periphery 118 tends to deflect, which reduces deflection, and improves blade stiffness, tracking, and life.

Despite the difference from the body slots 50, 54 in the saw blade 10, the body slots 150, 154 in the saw blade 110 also are designed according to the principles disclosed in U.S. Pat. No. 9,821,390. As such, the first and second body slots 150, 154 may be configured to provide one or zero modal frequencies in an operating frequency range of the saw blade.

Figures 9A, 9B:
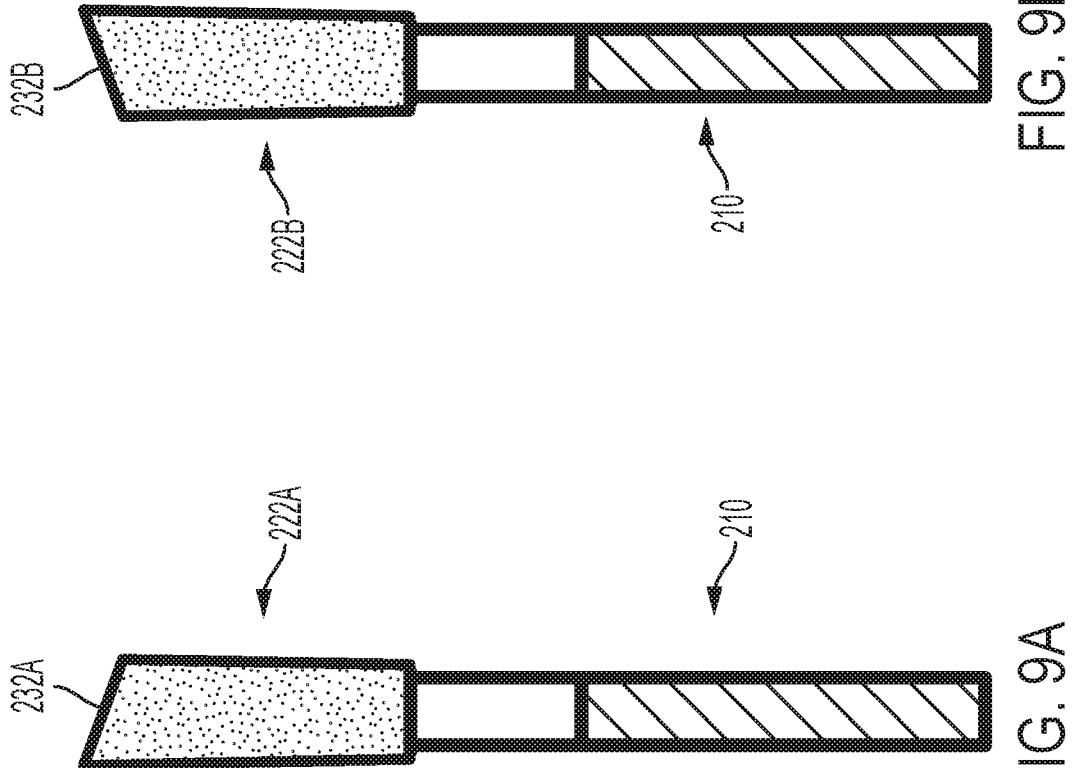
FIGS. 9A and 9B are front partially cross-sectional views of a first beveled tooth and a second beveled tooth of another embodiment of a saw blade having the body slots shown in FIG. 5.

In another embodiment, as shown in FIGS. 9A-9B, a saw blade 210 having body slots similar to body slots 150, 154 may have only beveled cutting teeth 222A, 222B with top faces 230A, 230B arranged in an alternating top bevel (ATB) pattern, with no unbeveled or raker teeth, and with no drop distance between the top faces 230A, 230B of the beveled teeth 222A, 222B. In other embodiments, the body slots 150, 154 may be used with other embodiments of circular saw blades, such as saw blades without carbide inserts so that there is no bevel on the cutting teeth.

Experimental testing of the saw blades described above confirm the significant improvements in tracking and blade life. For example, in a tracking test, saw blades in accordance with the embodiments in FIGS. 5-9C, having a 7¼ inch diameter and 24 teeth, were compared to Diablo® 7¼ inch×24-Teeth Tracking Point Framing Saw Blades (Model No. D0724R), sold by Freud America, Inc. and to DEW- ALT® 7¼ inch×24-Teeth Precision Framing™ Saw Blades (Model No. DW3199), sold by DeWalt Industrial Tool Co., two of the leading commercially available circular saw blades. The test was performed by installing each blade in a worm drive powered circular saw controlled by a robot arm. The robot measured the force and the angle of the blade. The test would begin by running the robot for several cuts, using constant force, to determine the angle of the blade that had the least side force and that would be set as the zero angle. The robot would then run the blade at the set angle, using constant speed, until a certain side force threshold was achieved, indicating that the saw blade was not tracking in a straight line.

Figure 10:
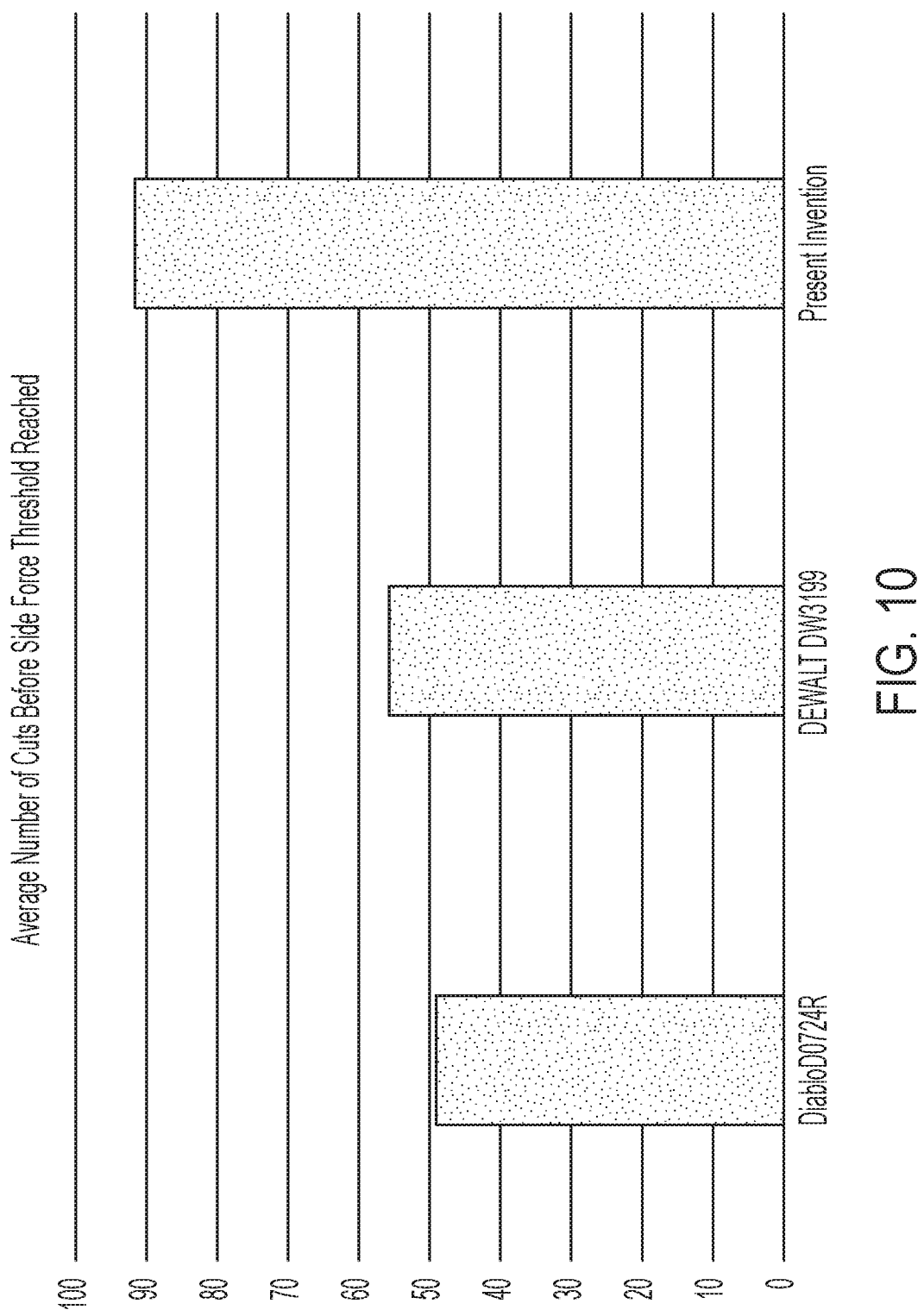
FIG. 10 is a chart illustrating the results of a tracking test of saw blades in accordance with the embodiment of FIGS. 5-8C.

The results of this tracking test are shown in FIG. 10. As illustrated, the Diablo® D0724R saw blades and the DEW-ALT® DW3199 saw blades averaged 49 cuts and 56 cuts before the side force threshold was reached. In contrast, the saw blades of the present invention averaged 92 cuts before the side force threshold was reached, indicating much improved tracking. This represents an 88% improvement over the Diablo® D0724R saw blades and a 64% improvement over the DEWALT® DW3199 saw blades.

In a life test, the same saw blades were compared by installing each saw blade in a rig that simulates cutting using a powered circular saw. The rig rotated the saw blades at 3000 rpm and applied a biasing force of 6 pounds, at a feed rate of 8.57 feet per minute (fpm), cutting double stacked ¾' thick particle board. The test measured the number of linear feet that could be cut by each saw blade until the saw blade reached the end of life.

Figure 11:
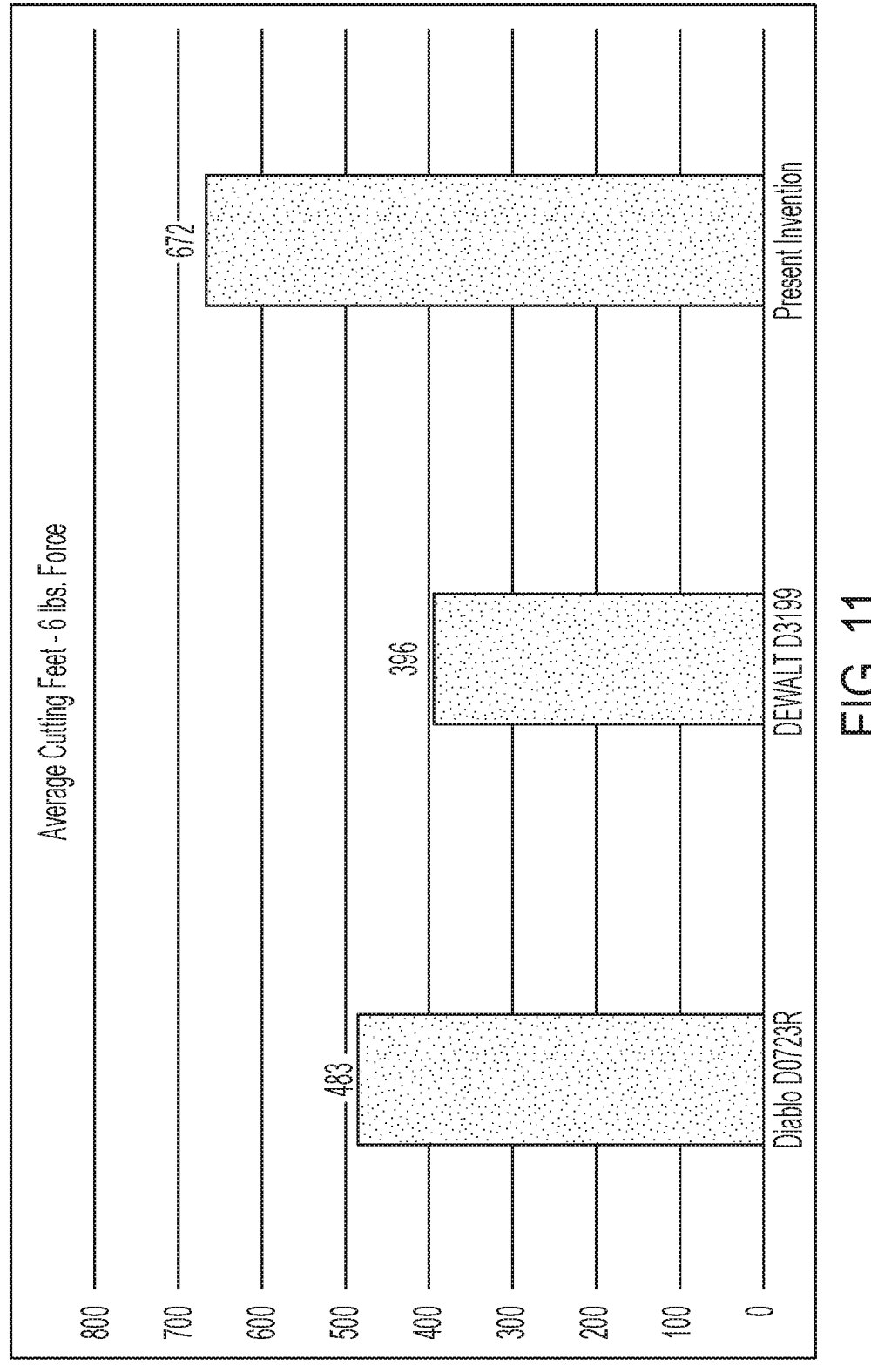
FIG. 11 is a chart illustrating the results of a life test of saw blades in accordance with the embodiment of FIGS. 5-8C.

The results of the life test are shown in FIG. 11. As illustrated, the Diablo® D0724R saw blades and the DEW-ALT® DW3199 saw blades averaged cutting 483 feet and 396 feet before end of life, respectively. In contrast, the saw blades of the present invention averaged cutting 672 feet before end of life, respectively, indicating much improved life. The saw blades of the present invention had a 39% improvement and 70% improvement in life over the Diablo® D0724R saw blades and DEWALT® DW3199 saw blades, respectively. Thus, the test results demonstrate that saw blades in accordance with the present invention greatly improve both blade tracking and blade life.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of the following claims.

What is claimed is:

1. A circular saw blade comprising:
a circular body having a first side face, a second side face opposite the first side face, a periphery, and a central opening defining a center point, the circular body rotatable in a rotational cutting direction; and
a plurality of repeating sets of teeth coupled to the periphery of the circular body, each set of teeth including
a first tooth having a first rake face facing an adjacent first gullet in the rotational cutting direction, a first lateral face adjacent the first side face of the circular body, a second lateral face adjacent the second side face of the circular body, and a first top face extending across the first tooth from a first top edge of the first lateral face of the first tooth to a second top edge of the second lateral face of the first tooth, the first top face intersecting the first rake face at a first cutting edge,
a second tooth following the first tooth in a direction opposite the rotational cutting direction, the second tooth having a second rake face facing an adjacent second gullet in the rotational cutting direction, a first lateral face adjacent the first side face of the circular body, a second lateral face adjacent the second side face of the circular body, and a second top face extending across the second tooth from a first top edge of the first lateral face of the second tooth to a second top edge of the second lateral face of the second tooth, the second top face intersecting the second rake face at a second cutting edge,
a third tooth following the second tooth in a direction opposite the rotational cutting direction, the third tooth having a third rake face facing an adjacent third gullet in the rotational cutting direction, a first lateral face adjacent the first side face of the circular body, a second lateral face adjacent the second side face of the circular body, and a third top face extending across the third tooth from the a first top edge of the first lateral face of the third tooth to a second top edge of the second lateral face of the third tooth, the third top face intersecting the third rake face at a third cutting edge,
wherein, in each set of teeth, (i) the first top face of the first tooth is beveled in a first direction radially inward toward the second side face of the body at a first bevel angle relative to a line perpendicular to the body, such that the second top edge of the first tooth is disposed closer to the center point than the first top edge of the first tooth, (ii) the second top face of the second tooth is beveled in a second direction opposite the first direction radially inward toward the first side face of the body at a second bevel angle relative to a line perpendicular to the body, such that the first top edge of the second tooth is disposed closer to the center point than the second top edge of the second tooth, and (iii) the third top face of the third tooth is unbeveled, such that the first top edge of the third tooth and the second top edge of the third tooth are disposed at the same distance from the center point, and
wherein all of the second teeth are disposed radially inward toward the central opening by a first drop distance from all of the first teeth and all of the third teeth are disposed radially inward toward the central opening by a second drop distance that is greater than the first drop distance from all of the first teeth.

2. The circular saw blade of claim 1, wherein the rake face of each tooth is disposed at a rake angle relative to a radial line extending from the center point and intersecting the cutting edge of that tooth, the rake angle between 15° and 22°.

3. The circular saw blade of claim 1, wherein the top face of each tooth is disposed at a relief angle relative to a tangent line to the periphery at the cutting edge of that tooth, the relief angle between 8° and 14°.

4. The circular saw blade of claim 1, wherein each first lateral face is disposed at a first lateral angle relative to the first side face of the body, and each second lateral face is disposed at a second lateral angle relative to the second side face of the body.

5. The circular saw blade of claim 1, wherein each of the first and second bevel angles are the same.

6. The circular saw blade of claim 1, wherein the first drop distance is between 0.025 mm and 0.075 mm.

7. The circular saw blade of claim 1, wherein the first and second top edges of each third tooth are disposed radially inward toward the central opening from the first top edge of each first tooth by the second drop distance.

8. The circular saw blade of claim 7, wherein the second drop distance is more than twice the first drop distance.

9. The circular saw blade of claim 1, wherein the first tooth, the second tooth, and the third tooth are spaced at a variable tooth pitch.

10. The circular saw blade of claim 9, wherein the variable tooth pitch comprises at least three different tooth pitches.

11. The circular saw blade of claim 9, wherein each first tooth is spaced from an adjacent second tooth in the rotational cutting direction by a first angular distance, each second tooth is spaced from an adjacent third tooth in the rotational cutting direction by a second angular distance that is greater than the first angular distance, and each third tooth is spaced from an adjacent first tooth in the next set of teeth in the rotational cutting direction by a third angular distance that is greater than the second angular distance.

12. The circular saw blade of claim 1, further comprising a first set of fully enclosed, arcuate inner body slots, each having a first midpoint and defined in the body between the central opening and the periphery, and a plurality of fully enclosed, arcuate outer body slots, each having a second midpoint and defined in the body between the inner body slots and the periphery, wherein each first midpoint is spaced a first radial distance from the center point and each second midpoint is spaced a second radial distance from the center point that is greater than the first radial distance, with each first midpoint radially aligned with one of the second midpoints to form a pair of aligned body slots.

13. The circular saw blade of claim 12, wherein the pairs of aligned body slots comprise three pairs of aligned body slots with their midpoints equally angularly spaced by 120°.

14. The circular saw blade of claim 12, wherein the pairs of aligned body slots comprise four pairs of aligned body slots with their midpoints equally angularly spaced by 90°.

15. The circular saw blade of claim 12, wherein each of the outer body slots has a pair of arcuate end sections and an undulating section between the arcuate end sections.

16. The circular saw blade of claim 12, wherein the first and second body slots are configured to provide one or zero modal frequencies in an operating frequency range of the saw blade.

17. The circular saw blade of claim 12, further comprising a tension region defined in the body disposed between the first set of body slots and the second set of body slots.

18. A circular saw blade comprising:
a circular body having a first side face, a second side face opposite the first side face, a periphery, and a central opening defining a center point, the circular body rotatable in a rotational cutting direction; and
a plurality of repeating sets of teeth coupled to the periphery of the circular body, each set of teeth including
a first tooth having a first rake face facing an adjacent first gullet in the rotational cutting direction, a first lateral face adjacent the first side face of the circular body, a second lateral face adjacent the second side face of the circular body, and a first top face extending across the first tooth from a first top edge of the first lateral face of the first tooth to a second top edge of the second lateral face of the first tooth, the first top face intersecting the first rake face at a first cutting edge,
a second tooth following the first tooth in a direction opposite the rotational cutting direction, the second tooth having a second rake face facing an adjacent second gullet in the rotational cutting direction, a first lateral face adjacent the first side face of the circular body, a second lateral face adjacent the second side face of the circular body, and a second top face extending across the second tooth from a first top edge of the first lateral face of the second tooth to a second top edge of the second lateral face of the second tooth, the second top face intersecting the second rake face at a second cutting edge,
a third tooth following the second tooth in a direction opposite the rotational cutting direction, the third tooth having a third rake face facing an adjacent third gullet in the rotational cutting direction, a first lateral face adjacent the first side face of the circular body, a second lateral face adjacent the second side face of the circular body, and a third top face extending across the third tooth from the a first top edge of the first lateral face of the third tooth to a second top edge of the second lateral face of the third tooth, the third top face intersecting the third rake face at a third cutting edge,
wherein, in each set of teeth, (i) the first top face of the first tooth is beveled in a first direction radially inward toward the second side face of the body at a first bevel angle relative to a line perpendicular to the body, such that the second top edge of the first tooth is disposed closer to the center point than the first top edge of the first tooth, (ii) the second top face of the second tooth is beveled in a second direction opposite the first direction radially inward toward the first side face of the body at a second bevel angle relative to a line perpendicular to the body, such that the first top edge of the second tooth is disposed closer to the center point than the second top edge of the second tooth, and (iii) the third top face of the third tooth is unbeveled, such that the first top edge of the third tooth and the second top edge of the third tooth are disposed at the same distance from the center point,
wherein all of the second teeth are disposed radially inward toward the central opening by a first drop distance from all of the first teeth, and all of the first teeth and the second teeth are unset.

19. The circular saw blade of claim 18, wherein all of the third teeth are disposed radially inward toward the central opening by a second drop distance that is greater than the first drop distance from all of the first teeth.

* * * * *